(12) United States Patent
Tseng et al.

(10) Patent No.: US 8,502,839 B2
(45) Date of Patent: Aug. 6, 2013

(54) TRANSFLECTIVE DISPLAY DEVICE AND DRIVING METHOD THEREOF

(75) Inventors: Sheng-Pin Tseng, Tao-Yuan Hsien (TW); Ching-Chao Chang, Tao-Yuan Hsien (TW); Chien-Yung Cheng, Tao-Yuan Hsien (TW)

(73) Assignee: HannStar Display Corp., Wugu Industrial Zone, Taipei County (TW)

( * ) Notice: Subject to any disclaimer, the term of this patent is extended or adjusted under 35 U.S.C. 154(b) by 823 days.

(21) Appl. No.: 12/166,343

(22) Filed: Jul. 2, 2008

(65) Prior Publication Data

US 2009/0135207 A1   May 28, 2009

(30) Foreign Application Priority Data

Nov. 22, 2007 (TW) .................... 96144285 A

(51) Int. Cl.
*G09G 5/10* (2006.01)
*G09G 3/36* (2006.01)

(52) U.S. Cl.
USPC ............................................ 345/690; 345/88

(58) Field of Classification Search
USPC .......................................... 345/102, 88, 690
See application file for complete search history.

(56) References Cited

U.S. PATENT DOCUMENTS

| | | | |
|---|---|---|---|
| 4,637,687 A | 1/1987 | Haim | |
| 4,693,560 A | 9/1987 | Wiley | |
| 6,243,070 B1 * | 6/2001 | Hill et al. | 345/589 |
| 6,724,934 B1 * | 4/2004 | Lee et al. | 382/167 |
| 8,018,450 B2 | 9/2011 | Kimura | |
| 2002/0105609 A1 * | 8/2002 | Moon | 349/113 |
| 2003/0067435 A1 * | 4/2003 | Liu | 345/101 |
| 2003/0095219 A1 * | 5/2003 | Lee | 349/110 |
| 2004/0104883 A1 * | 6/2004 | Drader | 345/102 |
| 2004/0222999 A1 * | 11/2004 | Choi et al. | 345/589 |
| 2005/0207046 A1 * | 9/2005 | Tamura | 359/891 |
| 2005/0231457 A1 * | 10/2005 | Yamamoto et al. | 345/102 |
| 2007/0063945 A1 * | 3/2007 | Hung et al. | 345/88 |
| 2007/0159492 A1 | 7/2007 | Lo | |
| 2007/0164953 A1 * | 7/2007 | Huang et al. | 345/88 |
| 2007/0188439 A1 * | 8/2007 | Kimura et al. | 345/102 |
| 2007/0252924 A1 * | 11/2007 | Haga et al. | 349/68 |
| 2008/0084524 A1 * | 4/2008 | Inuzuka et al. | 349/108 |
| 2008/0100645 A1 * | 5/2008 | Nitta | 345/690 |

FOREIGN PATENT DOCUMENTS

| | | |
|---|---|---|
| CN | 101025492 A | 8/2007 |
| TW | 200403493 | 3/2004 |
| TW | 200713163 | 4/2007 |

* cited by examiner

*Primary Examiner* — Chanh Nguyen
*Assistant Examiner* — Robert Stone
(74) *Attorney, Agent, or Firm* — Winston Hsu; Scott Margo

(57) ABSTRACT

A display device includes a display panel and a driving circuit. The display panel has a pixel including red, green, blue, and white sub-pixels. The driving circuit receives a display signal and provides at least a first luminance weighting and a second luminance weighting of the red, green, blue, and white sub-pixels respectively. The display device selects one of the first luminance weighting and the second luminance weighting to drive the pixel according to the different operating modes of the display device.

24 Claims, 16 Drawing Sheets

| G4 | R4 |
|---|---|
| B4 | W $\frac{4}{3}$ |

P1b

| G4 | R4 |
|---|---|
| B4 | W4 |

| G1 | R2 | G1 |
|----|----|----|
| B2 | W4 | B2 |
| G1 | R2 | G1 |

P2a

| G1 | B2 | G1 |
|----|----|----|
| R2 | W$\frac{4}{3}$ | R2 |
| G1 | B2 | G1 |

| G2 | R1 | G2 |
|---|---|---|
| B4 | W2 | B4 |
| G2 | R1 | G2 |

P3a

| G2 | R1 | G2 |
|---|---|---|
| B4 | $W\frac{2}{3}$ | B4 |
| G2 | R1 | G2 |

| W1 | B2 | W1 |
|---|---|---|
| R2 | G4 | R2 |
| W1 | B2 | W1 |

P4a

| $W\frac{1}{3}$ | B2 | $W\frac{1}{3}$ |
|---|---|---|
| R2 | G4 | R2 |
| $W\frac{1}{3}$ | B2 | $W\frac{1}{3}$ |

| B1 | W2 | B1 |
|---|---|---|
| G2 | R4 | G2 |
| B1 | W2 | B1 |

P5a

| B1 | W$\frac{2}{3}$ | B1 |
|---|---|---|
| G2 | R4 | G2 |
| B1 | W$\frac{2}{3}$ | B1 |

| B1 | W1 | B1 | W1 | B1 | W1 |
|----|----|----|----|----|----|
|    |    | R4 | G4 |    |    |
|    |    | B1 | W1 |    |    |

P6b

| B1 | $W\frac{1}{3}$ | B1 | $W\frac{1}{3}$ | B1 | $W\frac{1}{3}$ |
|----|----|----|----|----|----|
|    |    | R4 | G4 |    |    |
|    |    | B1 | $W\frac{1}{3}$ |    |    |

FIG. 15

TRANSFLECTIVE DISPLAY DEVICE AND DRIVING METHOD THEREOF

BACKGROUND OF THE INVENTION

1. Field of the Invention

The present invention relates to a display device, and more particularly, to a display device that adjusts a driving method according to luminance mode of the display device.

2. Description of the Prior Art

Display devices, an LCD for example, generate a color for a pixel through red, green, and blue sub-pixels. For example, when the red, green, and blue sub-pixels of the pixel have the same luminance weightings, the pixel displays gray levels of white and black. When the luminance weightings of the red, green, and blue sub-pixels are changed, different colors can be displayed. In general, the colors (red, green, and blue) of the sub-pixels are generated in several ways. For example, a backlight of the display device may generate white light, and the white light may be filtered by a color filter to generate the colors. Or, the backlight may have red, green, and blue light sources, so the color filter is not required, an RGB LED backlight being one example. When the LCD uses the color filter to generate the red, green, and blue colors, the low light transmittance of the color filter reduces the light penetrating the panel and increases the power consumption of the backlight. For increasing the light penetration of the backlight, a white pixel is added in the color filter. Thus, the light transmittance of the color filter is improved as well as the light penetration of the backlight, so that the power consumption of the display device can be reduced.

In general, for the display device with three sub-pixels (R, G, and B) or four sub-pixels (R, G, B, and W), the sub-pixels of the display device can be arranged in different ways. FIG. 1 is a diagram of an arrangement of the sub-pixels of a display device. A display panel A1 has red (R), green (G), and blue (B) sub-pixels. Each pixel P1 is defined by the red, green, and blue sub-pixels in a regular arrangement. For example, to display a white color on the pixel P1, each sub-pixel of the pixel P1 has the same luminance weighting, so the ratio of the luminance weightings is 1:1:1, such as each sub-pixel being 100% turned on. FIG. 2 shows another arrangement of the sub-pixels of a display device. A display panel A2 has red (R), green (G), blue (B) and white (W) sub-pixels. Each pixel P2 is defined by the red, green, blue and white sub-pixels in a regular arrangement. For example, to display a white color on the pixel P2, each sub-pixel of the pixel P2 has the same luminance weighting, so the ratio of the luminance weightings is 1:1:1:1, such as each sub-pixel being 100% turned on. FIG. 3 and FIG. 4 are other arrangements of RGBW sub-pixels differing from the regular arrangement in FIG. 2 according to the prior art. The sub-pixels in FIG. 3 and FIG. 4 are interlaced, and the sub-pixels of each pixel are driven with a specific ratio of luminance weightings, which is called pixel rendering technology. Please refer to FIG. 3. A display panel A3 utilizes 10 sub-pixels to define a pixel P3. Similarly, to display a white color in the pixel P3, when the red and green sub-pixels in the center are set to 100% luminance, the blue and white sub-pixels in the surroundings are set to 25% luminance respectively, so the ratio of the luminance weightings of the red, green, blue, and white sub-pixels of the pixel P3 is 1:1:0.25:0.25. From the comparison of FIG. 2 and FIG. 3, each sub-pixel in the display panel A3 has a larger area than the sub-pixel in the display panel A2. For example, the area of the pixel P2 corresponds to two sub-pixels of the pixel P3 (as shown by the dotted line in FIG. 3). The large sub-pixel of the display panel A3 improves the light penetration of the backlight but reduces the resolution. However, in the display panel A3, each sub-pixel of the pixel P3 not only belongs to the pixel P3, but also belongs to the pixels surrounding the pixel P3. Thus, the sub-pixel arrangement of the display panel A3 driven with the specific luminance weighting of the red, green, blue, and white sub-pixels can improve the light penetration of the backlight and the resolution of the display device. Please refer to FIG. 4 again. A display panel A4 utilizes nine sub-pixels to define a pixel P4. Similarly, to display a white color in the pixel P4, the ratio of the luminance weighting of the RGBW sub-pixels of the pixel P4 is 0.5:1:0.5:0.25. From the comparison of FIG. 2 and FIG. 4, each sub-pixel in the display panel A4 has a larger area than the sub-pixel in the display panel A2. For example, the area of the pixel P2 corresponds to one sub-pixel of the pixel P3 (as shown by the dotted line in FIG. 4). In the display panel A4, each sub-pixel of the pixel P4 not only belongs to the pixel P4, but also belongs to the pixels surrounding the pixel P4. Thus, the sub-pixel arrangement of the display panel A4 driven with the specific luminance weighting of the red, green, blue, and white sub-pixels can improve the light penetration of the backlight and the resolution of the display device.

In addition, the LCD can be categorized as a transmissive LCD, a reflective LCD, or a transflective LCD according to the backlight of the LCD. The transmissive LCD has a backlight for generating light beams that pass through the display panel. The reflective LCD has a reflective surface inside for reflecting ambient light. The reflective LCD collects the ambient light as it enters from the front of the display panel so that the reflective surface can reflect the ambient light through the display panel again. Thus, the reflective LCD can utilize the ambient light as all or part of light source. The transflective LCD has both transmissive and reflective modes. When the LCD is used in an outdoor environment or when the surroundings of the display panel are bright, the LCD can turn off or turn down the backlight inside, and utilize the ambient light reflected by the reflective surface as all or part of light source, i.e. the LCD displays the image with the reflective mode. When the LCD is used in an indoor environment or the surroundings of the display panel are dark, the LCD can turn on the backlight inside, i.e. the LCD displays the image with the transmissive mode. Thus, the power consumption of the LCD can be saved.

In conclusion, when the LCD is used generally in different kinds of portable electronic devices, the power consumption of the LCD plays an important role in design. As mentioned above, an LCD may be designed to have transflective control functions and a pixel array of red, green, blue, and white sub-pixels, so as to increase the penetration of the backlight and decrease the power consumption of the backlight. However, when the LCD operates in the reflective mode, the reflected light is absorbed twice by the color filter of the display panel so that the luminance of the reflected light in the red, green, and blue sub-pixels is even lower than in the white sub-pixel. Thus, the LCD may display incorrect gray levels or display different gray levels between different operating modes.

SUMMARY OF THE INVENTION

According to an embodiment of the present invention, a method for driving a display device is provided. The method comprises providing a pixel comprising a red sub-pixel, a green sub-pixel, a blue sub-pixel, and a white sub-pixel, generating a display signal for the pixel and providing at least a first luminance weighting and a second luminance weighting corresponding to the display signal, and utilizing one of the first luminance weighting and the second luminance weighting to drive the pixel. Each first luminance weighting and each second luminance weighting comprises luminance weightings of the red, green, blue, and white sub-pixels, and the luminance weightings of at least one of the sub-pixels are different in the first luminance weighting and the second luminance weighting.

According to another embodiment of the present invention, a display device comprises a display panel and a driving circuit. The display panel comprises a plurality of pixels, and each pixel comprises at least one red sub-pixel, one green sub-pixel, one blue sub-pixel, and one white sub-pixel. The driving circuit receives a first display signal, and provides at least a first luminance weighting and a second luminance weighting corresponding to the display signal, and utilizes one of the first luminance weighting and the second luminance weighting to drive a corresponding pixel. Each first luminance weighting and each second luminance weighting comprises luminance weightings of the red, green, blue, and white sub-pixels, and the luminance weightings of at least one of the sub-pixels are different in the first luminance weighting and the second luminance weighting.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 1:
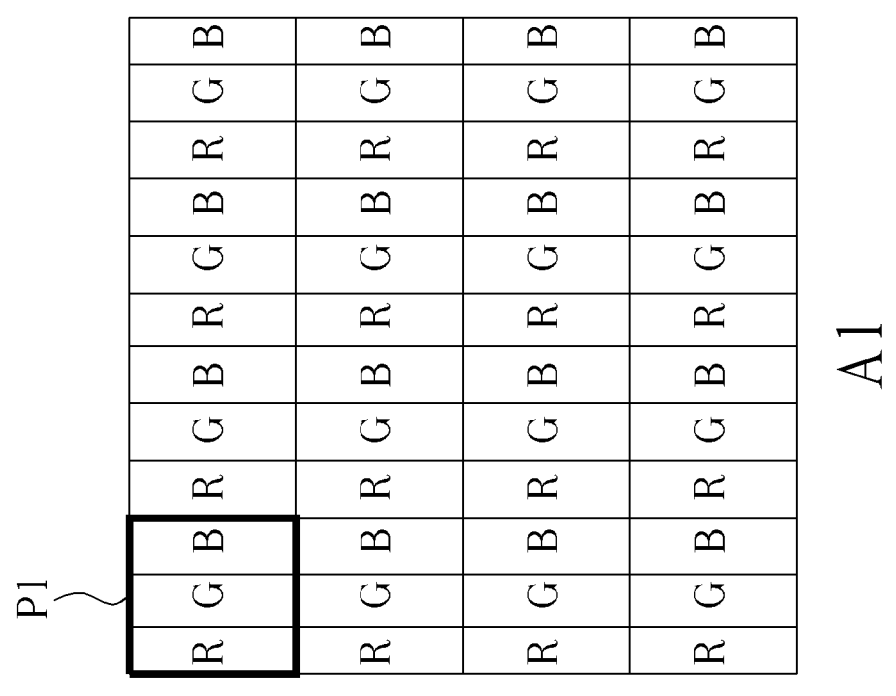

FIG. 1 is a diagram of an arrangement of sub-pixels of a display device.

Figure 2:
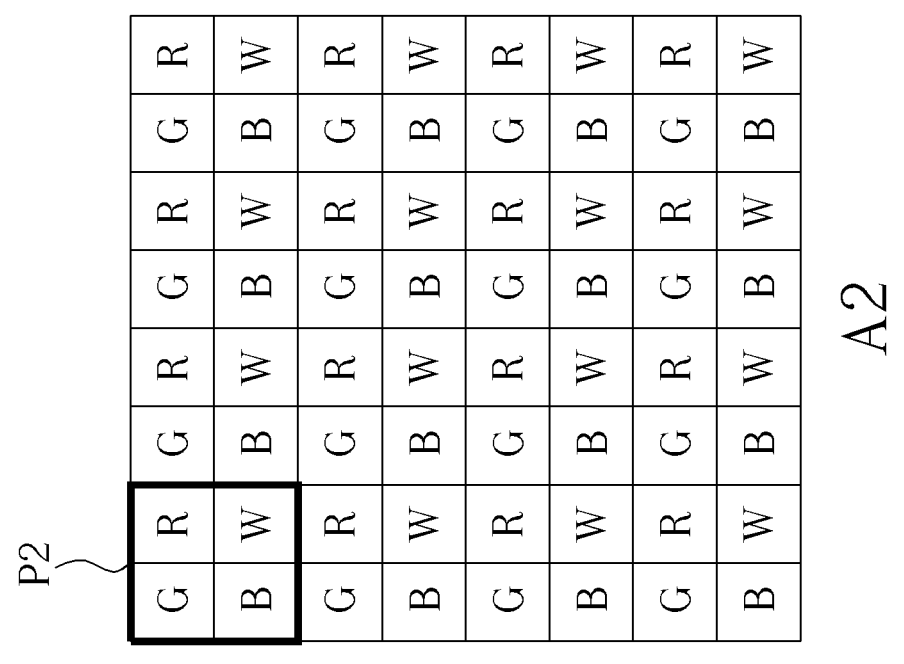

FIG. 2 shows another arrangement of sub-pixels of a display device.

Figure 3:
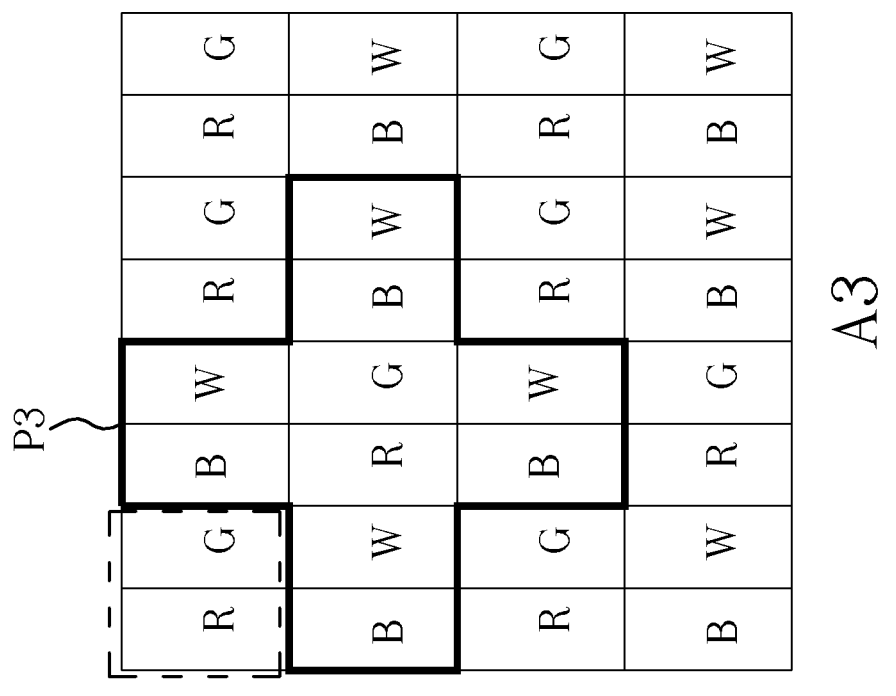
Figure 4:
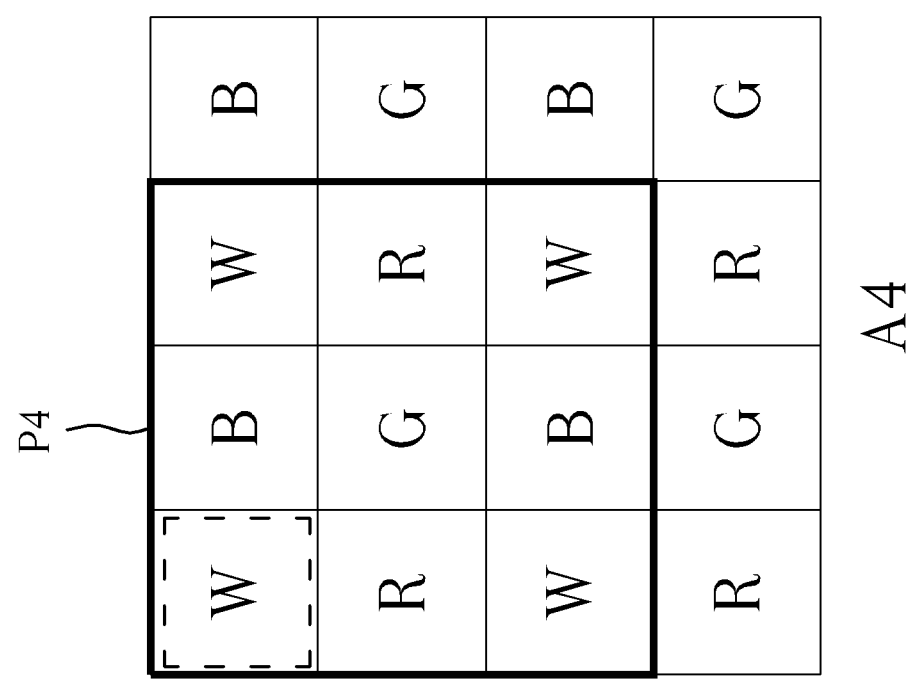

FIG. 3 and FIG. 4 are arrangements of RGBW sub-pixels different from the regular arrangement in FIG. 2 according to the prior art.

FIG. 10 to FIG. 15 are luminance configurations of a pixel with different sub-pixel arrangements of the display panel in FIG. 9.

DETAILED DESCRIPTION

Figure 5:
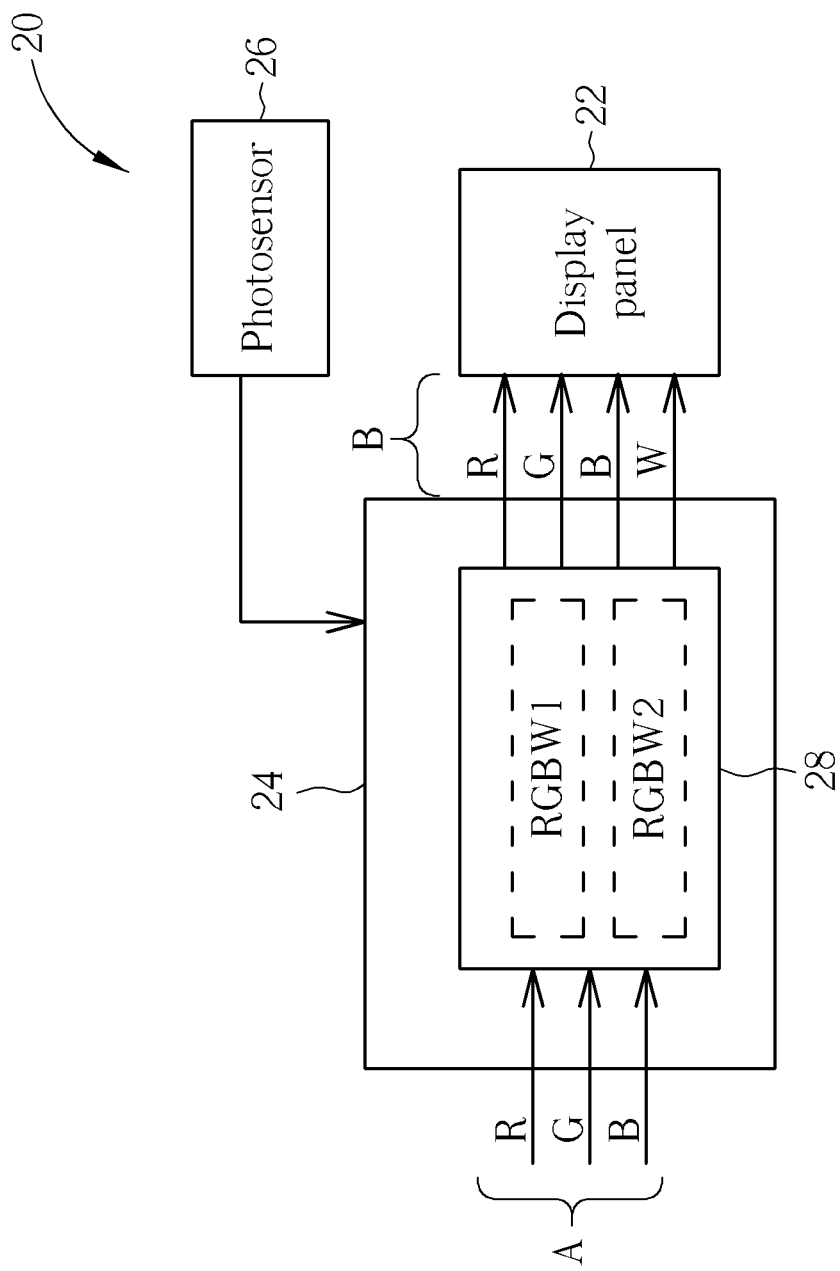
FIG. 5 is a first embodiment of a display device according to the present invention.

Please refer to FIG. 5, which is a first embodiment of a display device according to the present invention. The display device 20 comprises a display panel 22, a driving circuit 24, and a photosensor 26. The display panel 22 is a transflective LCD, so the display device 20 can use a backlight internally or ambient light or combination thereof as the light source. The display panel 22 comprises a pixel array having a plurality of pixels, and each pixel is defined by red, green, blue, and white sub-pixels. The sub-pixel arrangement of the pixel array can use pixel rendering technology or any other method. The driving circuit 24 comprises a data signal processing unit 28. Each pixel of the pixel array of the display panel 22 comprises a white sub-pixel, so the data signal processing unit 28 can convert a pixel image signal A for driving a pixel to a pixel image signal B. The pixel image signal A comprises the original image data of the red, green, and blue sub-pixels, and the pixel image signal B comprises the image data of the red, green, blue, and white sub-pixels to be displayed. The pixel image signal A and the pixel image signal B can be calculated as in formula (1), which is a mapping relationship. The white sub-pixel of the pixel array is used to increase the light transmittance. However, when the display panel 22 operates in the reflective mode, the reflective light is absorbed twice by the color filter of the display panel 22 so that the luminance of the reflective light in the red, green, and blue sub-pixels is even lower than in the white sub-pixel comparable to the transmissive mode. Thus, when the display device 20 operates in the different operating modes (transmissive mode and reflective mode), the display device 20 should use different luminance weightings of the red, green, blue, and white sub-pixels so as to display gray levels of each pixel correctly.

$$[R, G, B] \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} = [R, G, B, W] \quad \text{formula (1)}$$

In the embodiment of the present invention, the data signal processing unit 28 can provide at least two luminance weightings RGBW1 and RGBW2 of the red, green, blue, and white sub-pixels according to the pixel image signal of each pixel. The first luminance weighting RGBW1 is used when the display device 20 operates in the transmissive mode, and the second luminance weighting RGBW2 is used when the display device 20 operates in the reflective mode, and each RGBW1 and RGBW2 could have corresponding matrix form [aij] shown in formula (1). The photosensor 26 in this embodiment is installed close to the display panel 22 for detecting the surrounding luminance of the display panel 22 and sending a feedback signal to the driving circuit 24, however, in another embodiment, The photosensor 26 could be made integrally inside the display panel 22. A user can set the backlight mode of the display device 20 according to the environment of the display device 20, or let the display device 20 select the backlight mode automatically so that the driving circuit 24 will switch the backlight mode of the display device 20 according to the feedback signal from the photosensor 26. When the display device 20 is used in the indoor environment or when the surroundings of the display device 20 are dark, e.g. the luminance is lower than a predetermined level, the display device 20 is switched to the transmissive mode. Thus, the display device 20 turns on the backlight or increases the luminance of the backlight from the present luminance of the backlight, and the driving circuit 24 utilizes the first luminance weighting RGBW1 to drive the corresponding pixels. When the display device 20 is used in the outdoor environment or when the surroundings of the display panel are bright, e.g. the luminance is higher than a predetermined level, the display device 20 is switched to the reflective mode. Thus, the display device 20 turns the backlight off or down, and the driving circuit 24 utilizes the second luminance weighting RGBW2 to drive the corresponding pixels.

Figure 6:
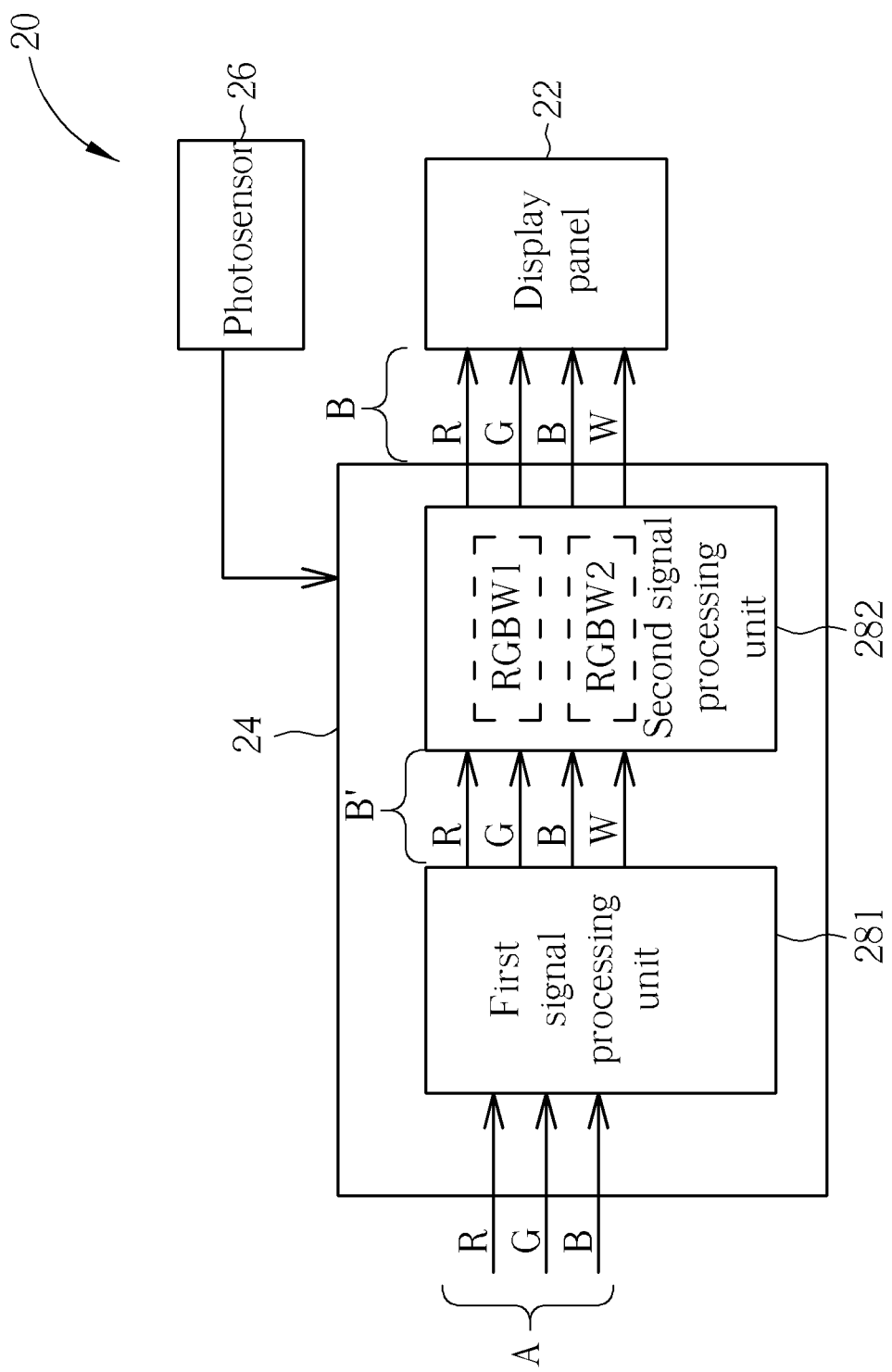
FIG. 6 is a second embodiment of a display device according to the present invention.
Figure 7:
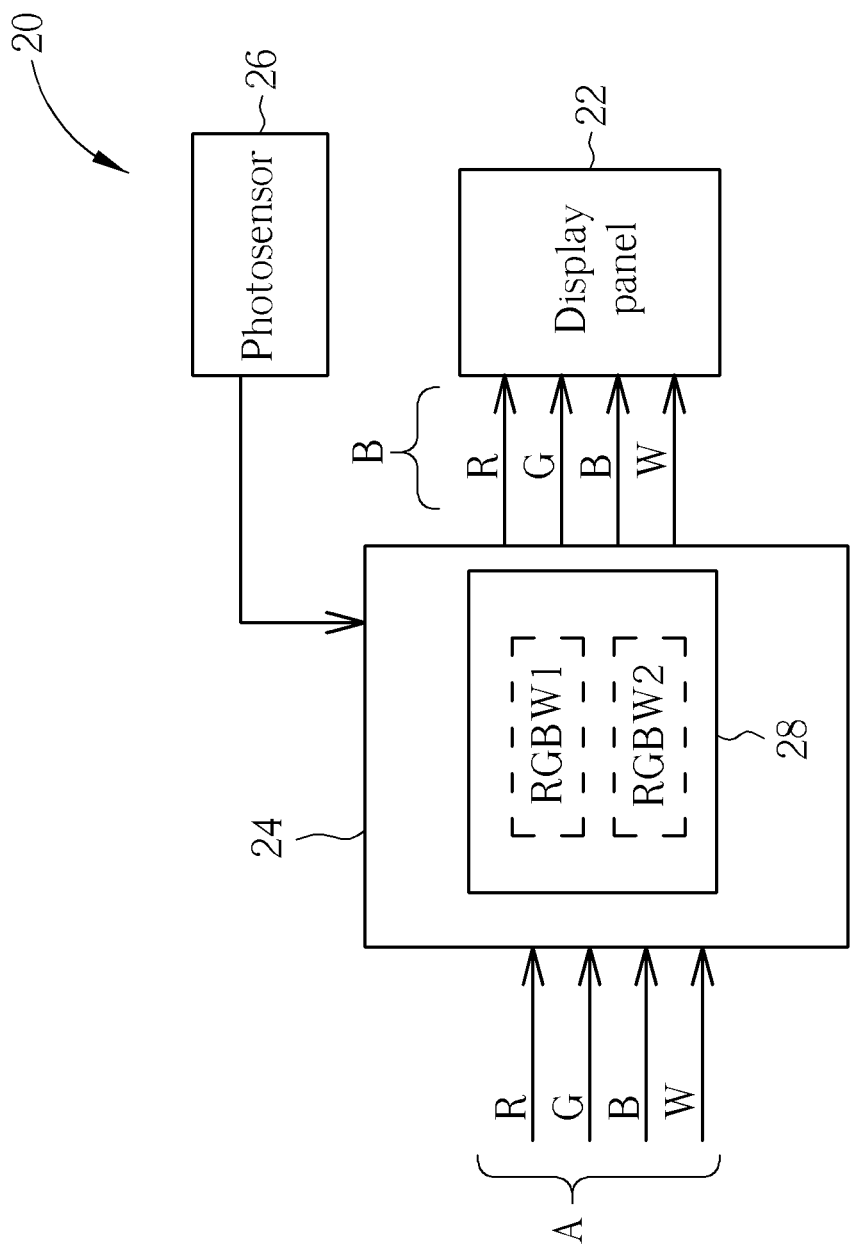
FIG. 7 is a third embodiment of a display device according to the present invention.

It is to be noted that the driving circuit 24 of another embodiment in FIG. 6 different from FIG. 5 comprises a first signal processing unit 281 and a second signal processing unit 282. The first signal processing unit 281 is used to convert a pixel image signal A including the red, green, and blue sub-pixel image data to a pixel image signal B' including the red, green, blue, and white sub-pixel image data. The second signal processing unit 282 provides at least two luminance weightings RGBW1 and RGBW2 of the red, green, blue, and white sub-pixels according to the pixel image signal B'. Then, the driving circuit 24 utilizes one of the first luminance weighting RGBW1 and the second luminance weighting RGBW2 to drive the corresponding pixels of the display panel 22. For example, when the display device 20 operates in the transmissive mode, the first luminance weighting RGBW1 is used to drive the corresponding pixels. When the display device 20 operates in the reflective mode, the second luminance weighting RGBW2 is used to drive the corresponding pixels. In addition, in another embodiment shown in FIG. 7, the driving circuit 24 comprises a pixel image signal A including the red, green, blue, and white sub-pixel data, and provides at least two luminance weightings RGBW1 and RGBW2 of the red, green, blue, and white sub-pixel data according to the pixel image signal A. Then, as mentioned above, the driving circuit 24 utilizes one of the first luminance weighting RGBW1 and the second luminance weighting RGBW2 to drive the corresponding pixels. However, the driving circuit 24 according to the present invention is not limited to the above embodiments, and the driving circuits that can provide at least two luminance weightings for a pixel image signal are still within the spirit and scope of the invention. The driving circuit 24 of the above embodiments can be implemented with an integrated circuit, a chip, or any other circuit design for performing the above functions.

Figure 8:
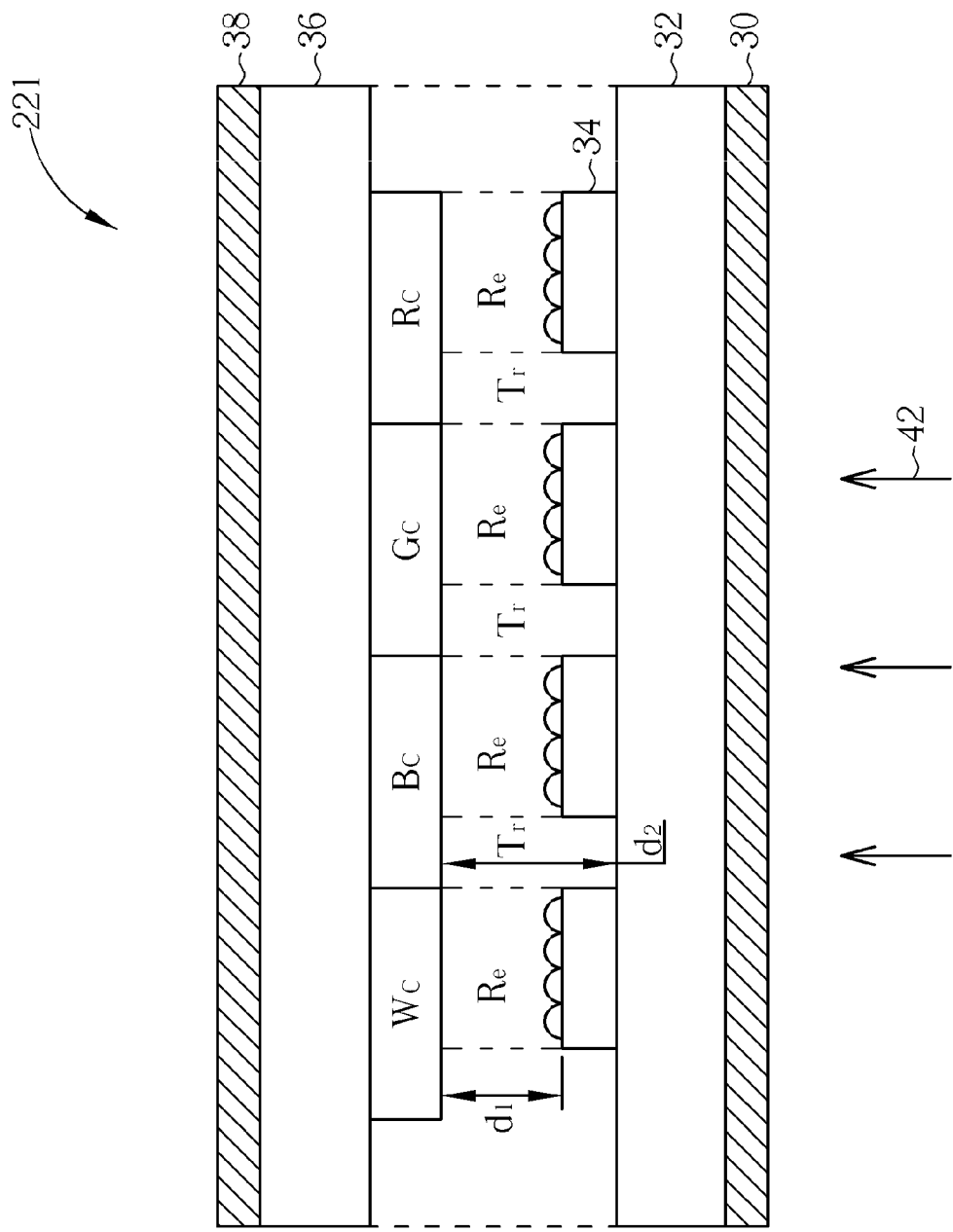
FIG. 8 is a diagram of an embodiment of the display panel in FIG. 5.

Please refer to FIG. 8. FIG. 8 is a diagram of an embodiment of the display panel 22 in FIG. 5. In this embodiment, the display panel 221 comprises a first polarizer 30, a TFT substrate 32, a reflective unit 34, a color filter substrate 36, and a second polarizer 38. The reflective unit 34 is installed on the TFT substrate 32, and each red, green, blue, and white sub-pixel respectively comprises a reflective unit 34 for reflecting the light from the top. The reflective unit 34 defines the reflective area Re and the transmissive area Tr between each sub-pixel. The TFT substrate 32 and the color filter substrate 36 form two cell gaps with different heights d1 and d2. Two cell gaps d1 and d2 can solve a problem of phase retardation difference between the reflective light and the transmissive light. As shown in FIG. 8, the white sub-pixel of the display panel 221 corresponds to the transparent color absorption area Wc so as to increase the light transmittance. The white sub-pixel may not have 100% transmittance, which may have a gray color. However, the light reflected by the reflective unit 34 of the red, green, and blue sub-pixels is absorbed twice (one as incident path, and the other as reflected path) in color absorption areas Bc, Gc, and Rc of the color filter substrate 36, so that the luminance of the red, green, and blue sub-pixels is lower than the white sub-pixel. Thus, when the display panel 221 operates in different operating modes, it has to utilize different luminance weightings of the red, green, blue, and white sub-pixels to drive the corresponding pixels.

Figure 9:
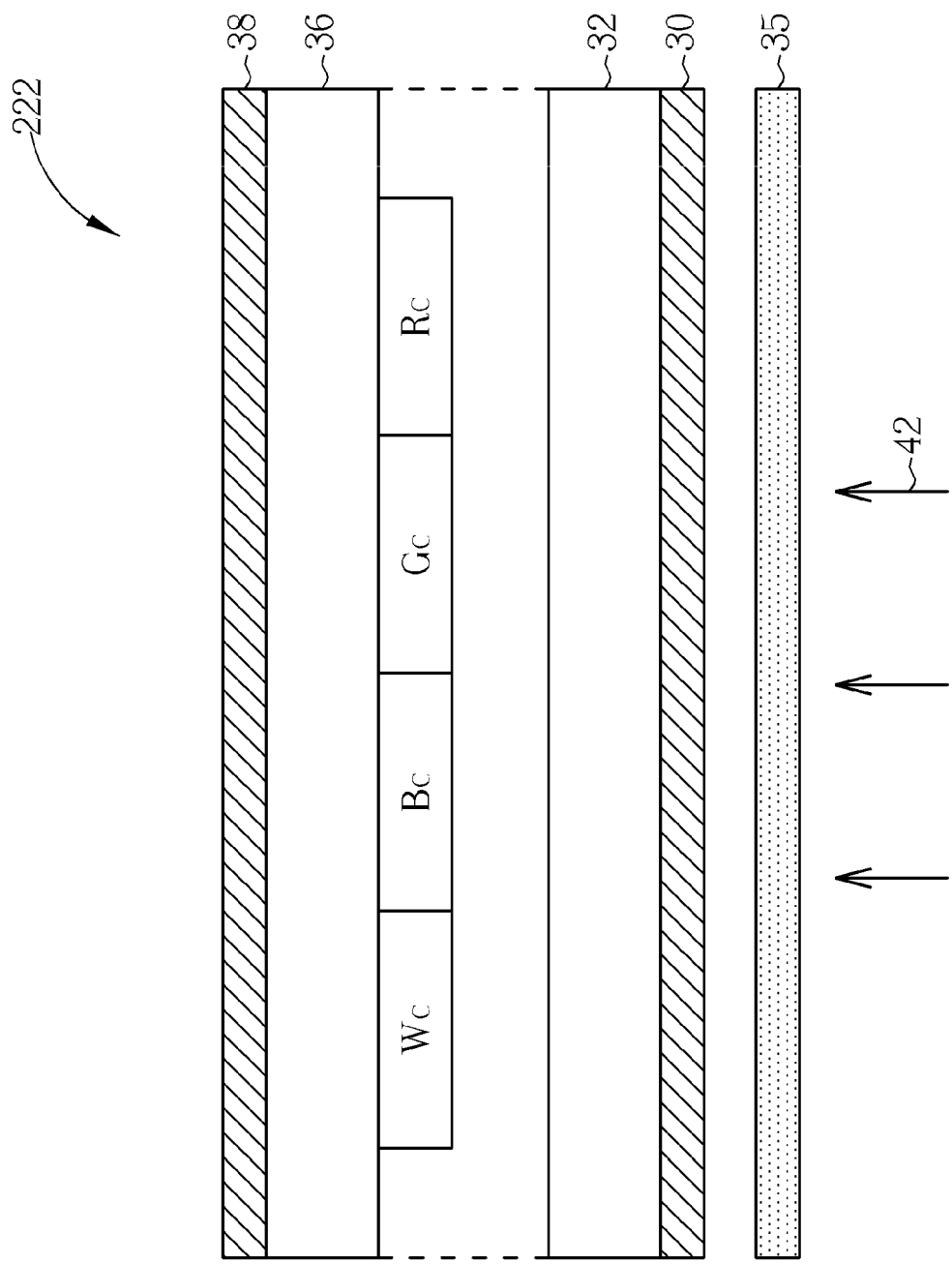
FIG. 9 is a diagram of another embodiment of the display panel in FIG. 5.

Please refer to FIG. 9, which is a diagram of another embodiment of the display panel 22 in FIG. 5. In this embodiment, the display panel 222 comprises a transreflective plate 35, such as a TMR (transmissive micro-reflector) panel, installed below the first polarizer 30. The transreflective plate 35 comprises a reflective unit so as to partially transmit the light from the bottom and reflect the light from the top. The transreflective plate 35 is installed outside the TFT substrate 32 so that the TFT substrate 32 and the color filter substrate 36 form the cell gap of the same height for the transmissive and reflective modes. Thus, the transreflective plate 35 does not have the problem of the phase difference of the reflective light and the transmissive light. Similarly, the white sub-pixel can increase the light transmittance, but the light passing through the red, green, and blue sub-pixels is absorbed twice (once as incident light, and again as reflected light) by the color filter substrate 36, so that the luminance of the red, green, and blue sub-pixels is lower than the white sub-pixel. Thus, when the display panel 222 operates in different operating modes, it has to utilize different luminance weightings of the red, green, blue, and white sub-pixels to drive the corresponding pixels.

Figure 10:
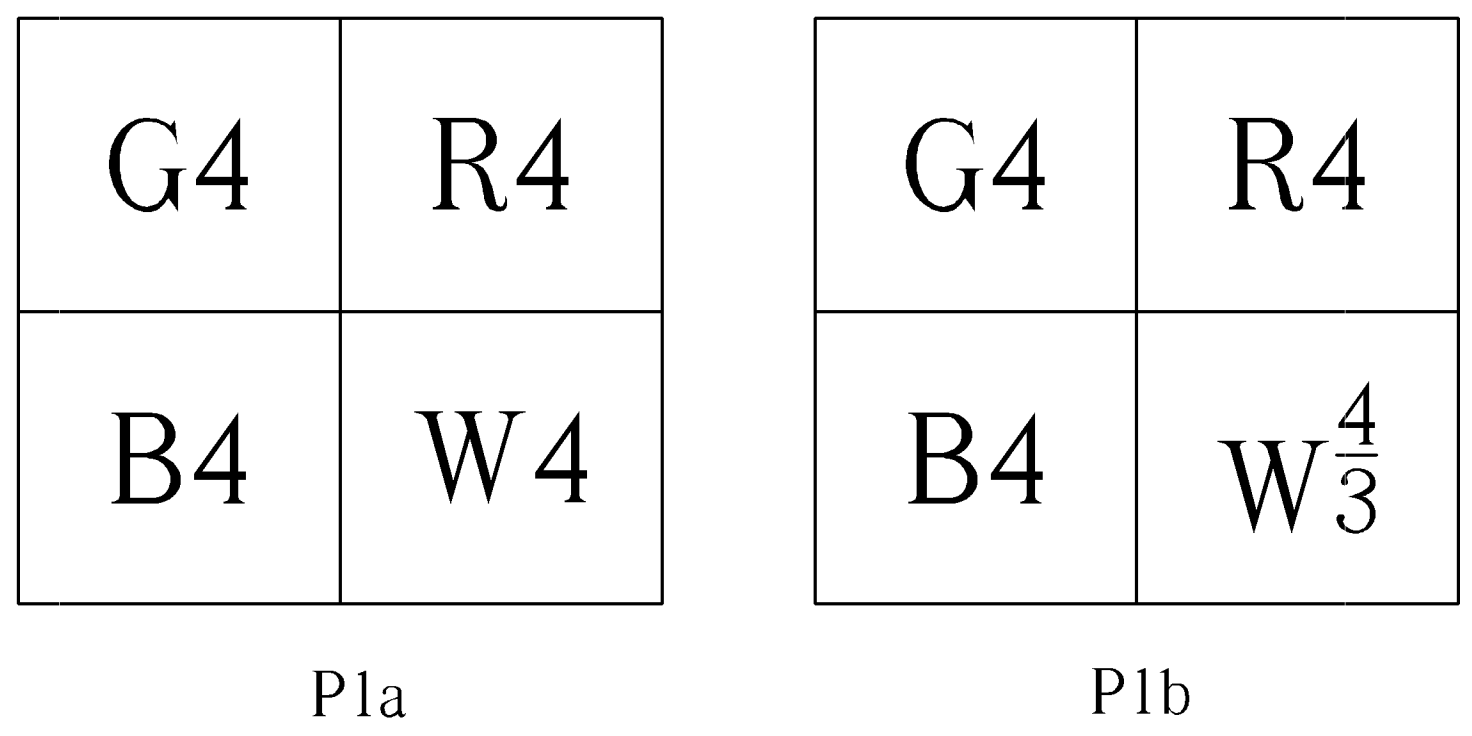

Please refer to FIG. 10, which illustrates the luminance configuration of the pixel of the display panel 222 in FIG. 9. In FIG. 10, the pixel P1 is defined by the red, green, blue, and white sub-pixels according to the conventional arrangement without the pixel rendering technology. The pixel P1$a$ and the pixel P1$b$ represent the pixel P1 of the display panel 222 operating in the transmissive mode and in the reflective mode respectively, and the pixel P1 is displayed to a white color for simply explaining. The numbers in FIG. 10 represent the luminance weightings of the red, green, blue, and white sub-pixels. In this embodiment, assume the light transmittance of the red, green, and blue sub-pixels corresponding to the color absorption area of the color filter substrate 36 is $\frac{1}{3}$, and the light transmittance of the white sub-pixel is 1. When the photosensor 26 detects the display panel 222 operating in the indoor environment or in the dark surroundings, e.g. the photosensor 26 detects the surrounding luminance of the display panel 222 is lower than a predetermined level, the display device 20 switches to the transmissive mode. Thus, the display device 20 turns on the backlight or increases the luminance of the backlight from the present luminance of the backlight, and the driving circuit 24 utilizes the first luminance weighting RGBW1 to drive the pixel P1. For the pixel P1$a$ shown in FIG. 10, in the transmissive mode, the luminance of the red, green, blue, and white sub-pixels of the pixel P1 is set to 4 units to display a white color, so the first luminance weighting RGBW1 is 4, 4, 4, 4; that is, the ratio of the first luminance weighting RGBW1 of the red, green, blue, and white sub-pixels is 1:1:1:1.

However, when the photosensor 26 detects the display panel 222 operating in the outdoor environment or in the bright surroundings, for example, if the photosensor 26 detects that the surrounding luminance of the display panel 222 is higher than a predetermined level, the display device 20 switches to the reflective mode. Thus, the display device 20 turns off or turns down the backlight from the present luminance of the backlight, and the driving circuit 24 utilizes the second luminance weighting RGBW2 to drive the pixel P1. As the pixel P1$b$ shown in FIG. 10, in the reflective mode, the luminance of the red, green, and blue sub-pixels of the pixel P1 is set to 4 units, and the luminance of the white sub-pixel of the pixel P1 is set to 4/3 units, so the second luminance weighting RGBW2 is 4, 4, 4, 4/3; that is, the ratio of the second luminance weighting RGBW2 of the red, green, blue, and white sub-pixels is 4:4:4:4/3. Please refer to FIG. 9 again. The pixel P1$a$ and the pixel P1$b$ in FIG. 10 have different ratio of the luminance weightings because, when the display device 20 operates in the reflective mode, the light of the red, green, and blue sub-pixels is absorbed by the color filter substrate 36 once more than in the transmissive mode. However, the light transmittance of the white sub-pixel is 1, so the white sub-pixel luminance weighting of the second luminance weighting RGBW2 for the pixel P1$b$ is adjusted to 4/3. In other words, when the display device 20 operates in the reflective mode, the reflected light of the red, green, and blue sub-pixels is absorbed by the color filter substrate 36 once more, so the display device 20 turns down the luminance weighting of the white sub-pixel for balancing the luminance of each sub-pixel. Thus, the display device 20 can display the same or more similar gray levels in the reflective mode and in the transmissive mode.

Although the above as well as the following embodiments are illustrated according to the display panel 222 in FIG. 9 for simply explaining, it is noted that all the methods or operating mentioned in all the embodiments of the present invention are also adapted to the display panel 221 in FIG. 8 or other display panels.

The red, green, blue, and white sub-pixels of the pixel P2 in FIG. 11 different from FIG. 10 are arranged with pixel rendering technology. The pixel P2a and the pixel P2b represent the pixel P2 in the transmissive mode and in the reflective mode respectively, and the pixel P2 is displayed to a white color. The numbers in FIG. 11 represent the luminance weightings of the red, green, blue, and white sub-pixels. Similarly, in this embodiment, assume the light transmittance of the red, green, and blue sub-pixels corresponding to the color absorption area of the color filter substrate 36 is ⅓, and the light transmittance of the white sub-pixel is 1. When the photosensor 26 detects that the display panel 222 is operating in the indoor environment or in the dark surroundings, for example, when the photosensor 26 detects that the surrounding luminance of the display panel 222 is lower than a predetermined level, the display device 20 switches to the transmissive mode. Thus, the display device 20 turns on the backlight or increases the luminance of the backlight from the present luminance of the backlight, and the driving circuit 24 utilizes the first luminance weighting RGBW1 to drive the pixel P2, as shown by the pixel P2a in FIG. 11. In the transmissive mode, the luminance of the red and green sub-pixels is set to 2 units, the luminance of the blue sub-pixel is set to 1 unit, and the luminance of the white sub-pixels is set to 4 units to display a white color. The pixel P2 has two red sub-pixels, four green sub-pixels, two blue sub-pixels, and one white sub-pixel, so the total luminance of the red, green, blue, and white sub-pixels is 4 units. Thus, the luminance weighting of the red, green, blue, and white sub-pixels of the pixel P2 is 4, 4, 4, 4; that is, the ratio of the first luminance weighting RGBW1 is 1:1:1:1.

However, when the photosensor 26 detects the display panel 222 is operating in the outdoor environment or in the bright surroundings, for example, when the photosensor 26 detects the surrounding luminance of the display panel 222 is higher than a predetermined level, the display device 20 switches to the reflective mode. Thus, the display device 20 turns off or turns down the backlight from the present luminance of the backlight, and the driving circuit 24 utilizes the second luminance weighting RGBW2 to drive the pixels of the display panel 222, as shown by the pixel P2b in FIG. 11. In the reflective mode, the luminance of the red and green sub-pixels is set to 2 units, the luminance of the blue sub-pixel is set to 1 unit, and the luminance of the white sub-pixels is set to 4/3 units to display a white color. The pixel P2 has two red sub-pixels, four green sub-pixels, two blue sub-pixels, and one white sub-pixel, so the total luminance of the red, green, blue is 4 units, and the total luminance of the white sub-pixels is 4/3 units. Thus, the luminance weighting of the red, green, blue, and white sub-pixels of the pixel P2 is 4, 4, 4, 4/3; that is, the ratio of the second luminance weighting RGBW1 is 4:4:4:4/3. It is to be noted that although the first luminance weighting RGBW1 and the second luminance weighting RGBW2 in the above embodiments are used to represent or indicate the total luminance weightings of the same color sub-pixels respectively in this embodiment, in other embodiments, the first luminance weighting RGBW1 and the second luminance weighting RGBW2 can be used to represent or indicate the luminance weighting of each single sub-pixel respectively in the other embodiment.

Please refer to FIG. 9 again. The pixel P2a and the pixel P2b in FIG. 11 have different ratio of the luminance weightings because when the display device 20 operates in the reflective mode, the light of the red, green, and blue sub-pixels is absorbed by the color filter substrate 36 once more than in the transmissive mode. However, the light transmittance of the white sub-pixel is 1, so the white sub-pixel luminance weighting of the second luminance weighting RGBW2 for the pixel P2b is adjusted to 4/3 for balancing the luminance of each sub-pixel of the pixel P2. Thus, the display device 20 can display the same or more similar gray levels in the reflective mode and in the transmissive mode.

Similarly, in the embodiments of FIG. 12 to FIG. 14, the red, green, blue, and white sub-pixels of the pixel P3, P4, and P5 are arranged with different arrangement within a panel using pixel rendering technology. The pixel P3a, P4a, P5a, and the pixel P3b, P4b, P5b represent the luminance weighting corresponding to the transmissive mode and the reflective mode respectively to display a white color. The numbers in the figures represent the luminance weightings of the red, green, blue, and white sub-pixels. Similarly, assume the light transmittance of the red, green, and blue sub-pixels corresponding to the color filter substrate 36 is ⅓, and the light transmittance of the white sub-pixel is 1 in the embodiments. The pixels P3 to P5 have similar operations to the pixel P2, so they are not repeated here.

In addition, it is to be noted that the display panel according the present invention is not limited in the above. A display panel having a pixel defined by the red, green, blue, and white sub-pixels can be also driven by the method according the present invention. As shown in FIG. 15, for example, the pixel P6 is arranged with another pixel rendering technology, and the pixel P6a and P6b represent the luminance weightings of the display panel operating in the transmissive mode and in the reflective mode to display the pixel P6 to white color.

According to the above embodiments, one feature of the present invention is that when the display panel operates in different operating modes, it will adjust the luminance weightings of each sub-pixel which are respectively in the first and second luminance weightings according to its corresponding light transmittance or absorption of the color filter substrate. Thus, the display panel can display the same or more similar gray levels in the different operating modes. As in the above embodiments, for example, the display device adjusts the luminance weightings of the white sub-pixel according to the light transmittance of the color filter substrate in the different operating modes; that is, the adjustment value of the luminance weighting of the white sub-pixel in the second luminance weighting is ⅓ in comparison with other sub-pixels. That is the ratio of the luminance weighting of the white sub-pixels in the second luminance weighting to that in the first luminance weighting is ⅓. However, the adjustment value for the luminance weighting of the white sub-pixel could be adjusted according to the actual light transmittance of the color filter substrate in practice, and it is adjusted between ⅕ and ½ in general. In addition, in the above embodiments, only the luminance weighting of one of the sub-pixels, for example only the luminance weighting of the white sub-pixel, is adjusted between different operating modes, such as adjusted by an adjustment value ⅓. However, in another embodiment, the luminance weightings of some of the sub-pixels can also be adjusted, which is not limited to the white sub-pixel or not limited to only one sub-pixel. For example, when the light transmittances of the color absorption areas of the color filter substrate corresponding to the red, green, and blue sub-pixels are different, the luminance weightings of one (or some) of the sub-pixels can also be adjusted between the different operating modes. Similarly, according to the spirit of the embodiments, in another embodiment, the luminance weightings of the white sub-pixel respectively in the first luminance weighting and the second luminance weighting can also be set the same, which is set to a fixed value, and the luminance weightings of the red, green, and blue sub-pixels are adjusted for optimization via an adjustment value ⅕~½, that is, the luminance weightings of the red, green, and blue sub-pixels which are respectively in the first luminance weight and the second luminance weight may be different.

It is to be noted that the red, green, blue, and white sub-pixels of the display panel in the embodiment generate the colors with a color filter. However, the display panel according to the present invention is not limited to the display panel having a color filter, and may be adapted to a display panel which wants to adjust the luminance weightings of the red, green, blue, and white sub-pixels for improving the gray levels of the pixel.

Figure 16:
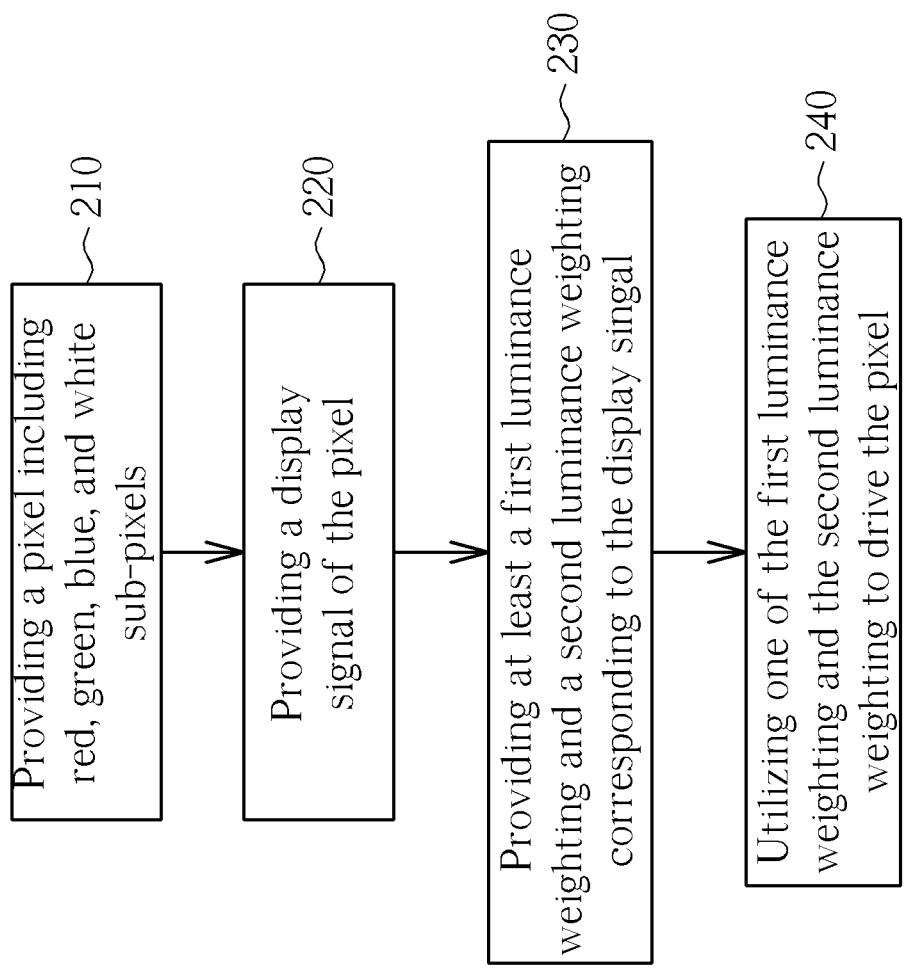
FIG. 16 is a flowchart of a pixel driving method according to the embodiment of the present invention.

Please refer to FIG. 16, which is a flowchart of the pixel driving method according to the embodiment of the present invention. The method comprises the following steps:

Step 210: Provide a pixel including at least red, green, blue, and white sub-pixels.

Step 220: Provide a display signal of the pixel.

Step 230: Provide at least a first luminance weighting and a second luminance weighting, each first luminance weighting and each second luminance weighting comprising the luminance weightings of the red, green, blue, and white sub-pixels, and the luminance weightings of at least one of the sub-pixels respectively in the first luminance weighting and the second luminance weighting are different.

Step 240: Utilize one of the first luminance weighting and the second luminance weighting to drive the pixel.

In conclusion, the pixel driving method according to the embodiments of the present invention provides at least two luminance weightings of sub-pixels corresponding to a display signal of a pixel, and selects one of the luminance weightings to drive the pixel. The two luminance weightings have difference in at least one of the sub-pixels. The pixel driving method according to the embodiments of the present invention is adapted to a display device having the red, green, blue, and white sub-pixels, and particularly to a display device having different operating modes, such as a transmissive mode and a reflective mode.

Those skilled in the art will readily observe that numerous modifications and alterations of the device and method may be made while retaining the teachings of the invention.

What is claimed is:

1. A method for driving a display device, the method comprising:
   providing a pixel comprising a red sub-pixel, a green sub-pixel, a blue sub-pixel, and a white sub-pixel;
   generating a display signal for the pixel and providing at least a first luminance weighting and a second luminance weighting corresponding to the display signal, wherein each of the first luminance weighting and second luminance weighting comprises luminance weightings of the red, green, blue, and white sub-pixels, and a fixed ratio of the luminance weightings of the red, green, blue, and white sub-pixels in the second luminance weighting to the luminance weightings of the red, green, blue, and white sub-pixels in the first luminance weighting is inversely proportional to a ratio of light transmittances of color absorption areas of a color filter substrate corresponding to the red, green, blue, and white sub-pixels; and
   utilizing one of the first luminance weighting and the second luminance weighting to drive the pixel.

2. The method of claim 1, wherein the first luminance weighting and the second luminance weighting correspond to different operating modes of the display device respectively.

3. The method of claim 1, wherein the luminance weightings of the white sub-pixel respectively in the first luminance weighting and the second luminance weighting are different.

4. The method of claim 1, wherein the luminance weightings of the red, green, and blue sub-pixels respectively in the first luminance weighting and the second luminance weighting are different.

5. The method of claim 1, wherein the ratio of the luminance weighting of the at least one of the sub-pixels in the first luminance weighting to that in the second luminance weighting is between ⅕ and ½.

6. The method of claim 1, further comprising:
   detecting an environment of the display device, wherein the utilizing one of the first luminance weighting and the second luminance weighting to drive the pixel is performed according to the detecting result.

7. The method of claim 6, wherein the detecting the environment of the display device comprises detecting luminance of ambient light of the display device.

8. The method of claim 7, wherein when the luminance of the ambient light of the display device is less than a first predetermined value, the first luminance weighting is utilized to drive the pixel.

9. The method of claim 7, wherein when the luminance of the ambient light of the display device is greater than a first predetermined value, the second luminance weighting is utilized to drive the pixel.

10. The method of claim 7, further comprising turning off or turning down a backlight of the display device when the luminance of the ambient light of the display device is greater than a first predetermined value.

11. The method of claim 1, wherein the red, green, blue, and white sub-pixels are arranged with pixel rendering technology.

12. The method of claim 1, wherein each red, green, blue, and white sub-pixel comprises a reflective unit respectively for reflecting external light of the display device.

13. A display device comprising:
   a display panel comprising a color filter substrate and a plurality of pixels, each pixel comprising at least one red sub-pixel, one green sub-pixel, one blue sub-pixel, and one white sub-pixel; and
   a driving circuit for receiving a first display signal, and providing at least a first luminance weighting and a second luminance weighting corresponding to the display signal, and utilizing one of the first luminance weighting and the second luminance weighting to drive a corresponding pixel, wherein each of the first luminance weighting and second luminance weighting comprises luminance weightings of the red, green, blue, and white sub-pixels, and a fixed ratio of the luminance weightings of the red, green, blue, and white sub-pixels in the second luminance weighting to the luminance weightings of the red, green, blue, and white sub-pixels in the first luminance weighting is inversely proportional to a ratio of light transmittances of color absorption areas of the color filter substrate corresponding to the red, green, blue, and white sub-pixels.

14. The display device of claim 13, wherein the first display signal comprises display signals of the red, green, blue, and white sub-pixels.

15. The display device of claim 13, wherein the driving circuit can generate a second display signal corresponding to the first display signal before providing at least the first luminance weighting and the second luminance weighting.

16. The display device of claim 15, wherein the first display signal comprises display signals of the red, green and blue sub-pixels, and the second display signal comprises display signals of the red, green, blue, and white sub-pixels.

17. The display device of claim 13, further comprising: a photosensor for detecting luminance of ambient light of the display panel and outputting a feedback signal to the driving circuit.

18. The display device of claim 13, wherein each red, green, blue, and white sub-pixel comprises a reflective unit respectively for reflecting the external light of the display device.

19. The display device of claim 13, wherein the red, green, blue, and white sub-pixels are arranged with pixel rendering technology.

20. The display device of claim 13, wherein the first luminance weighting and the second luminance weighting correspond to different operating modes of the display device respectively.

21. The display device of claim 13, wherein the luminance weightings of the white sub-pixel respectively in the first luminance weighting and the second luminance weighting are different.

22. The display device of claim 21, wherein the different operating modes comprise a transmissive mode and a reflective mode.

23. The display device of claim 13, wherein the ratio of the luminance weighting of the at least one of the sub-pixels in the first luminance weighting to that in the second luminance weighting is between $1/5$ and $1/2$.

24. The display device of claim 13, wherein each red, green, blue, and white sub-pixel comprises an area of color resist for generating the red, green, blue, and white light correspondingly.

* * * * *